United States Patent [19]

Bimba

[11] 4,453,747
[45] Jun. 12, 1984

[54] CONNECTOR SYSTEM FOR FLEXIBLE TUBING

[76] Inventor: Charles W. Bimba, 101 E. Main St., Monee, Ill. 60449

[21] Appl. No.: 383,491

[22] Filed: Jun. 1, 1982

[51] Int. Cl.³ .................... F16L 37/00; F16L 33/00; F16L 21/00; F16L 25/00
[52] U.S. Cl. ................................. 285/305; 285/238; 285/403; 285/421
[58] Field of Search ............... 285/305, 421, 238, 404, 285/403

[56] References Cited

U.S. PATENT DOCUMENTS

| | | | |
|---|---|---|---|
| 3,538,940 | 11/1970 | Graham | 285/305 X |
| 3,560,027 | 2/1971 | Graham | 285/305 X |
| 3,842,870 | 10/1974 | Burgess | 285/305 X |
| 3,973,791 | 8/1976 | Porta et al. | 285/305 |
| 4,021,062 | 5/1977 | Mariaulle | 285/39 |
| 4,059,295 | 11/1977 | Helm | 285/305 |
| 4,244,608 | 1/1981 | Stuemky | 285/305 |

FOREIGN PATENT DOCUMENTS

| | | | |
|---|---|---|---|
| 745526 | 2/1956 | United Kingdom | 285/305 |
| 902447 | 8/1962 | United Kingdom | 285/305 |

OTHER PUBLICATIONS

IBM Technical Disclosure Bulletin, vol. 20, No. 9, Feb. 1978, pp. 3662, 3663.

Primary Examiner—Richard J. Scanlan, Jr.
Attorney, Agent, or Firm—Barry L. Clark

[57] ABSTRACT

Compact, low cost connector system for flexible tubing is adapted to removably connect a length of flexible plastic tubing for rotational but not axial movement to a recessed opening in a body member such as a pneumatic valve, a fitting, or an air cylinder. Preferably, a cylindrical sleeve member having transverse slots extending completely through opposed walls of the member is pre-positioned in a stepped recessed opening in axially spaced relationship with an elastomeric O-ring sealing member. The sleeve member is preferably retained in a fixed relation relative to the body member by a U-shaped clip. When one desires to attach a length of tubing, the U-shaped clip is removed and the tubing is inserted into the sleeve and O-ring such that its tip portion goes beyond the O-ring into a small central recessed aperture formed in the body member. The legs of the U-shaped retaining clip are then pressed through a pair of spaced, axially transverse opening portions in the body member so as to pass through the transverse slots in the sleeve member and into contact with opposed outer wall surfaces of the tubing. The clip legs slightly compress and deform the tubing and have sharp edge portions which slightly cut into it to prevent it from being removed by pulling or by fluid pressure, yet permitting rotation of the tubing relative to the body member.

10 Claims, 8 Drawing Figures

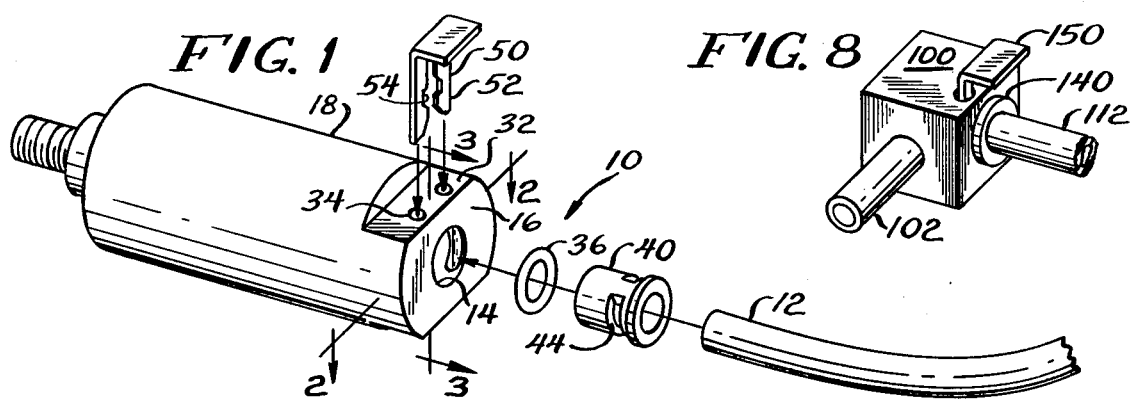
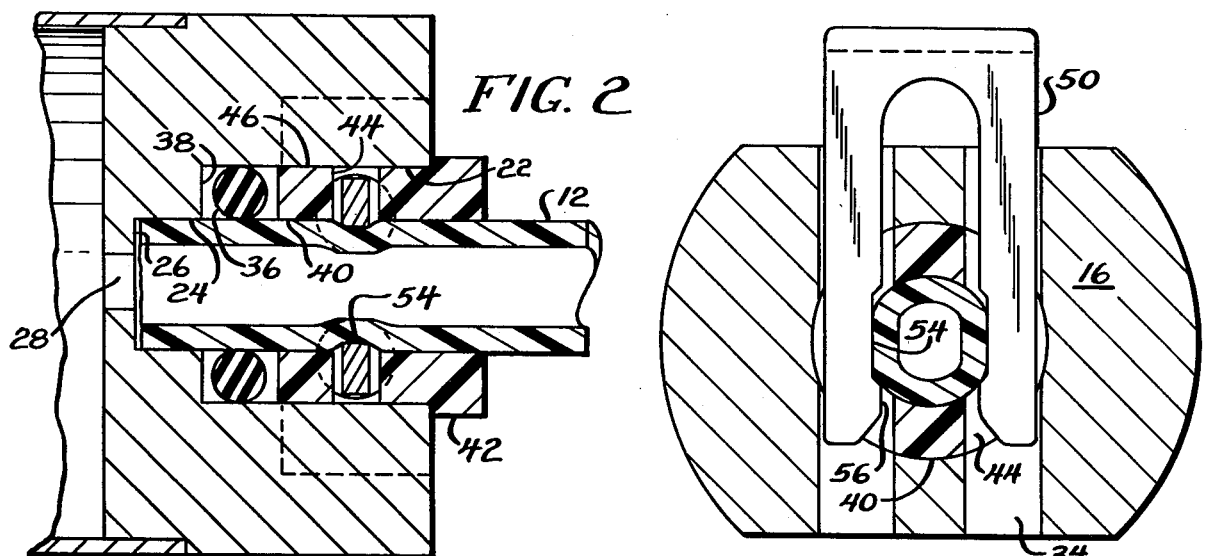
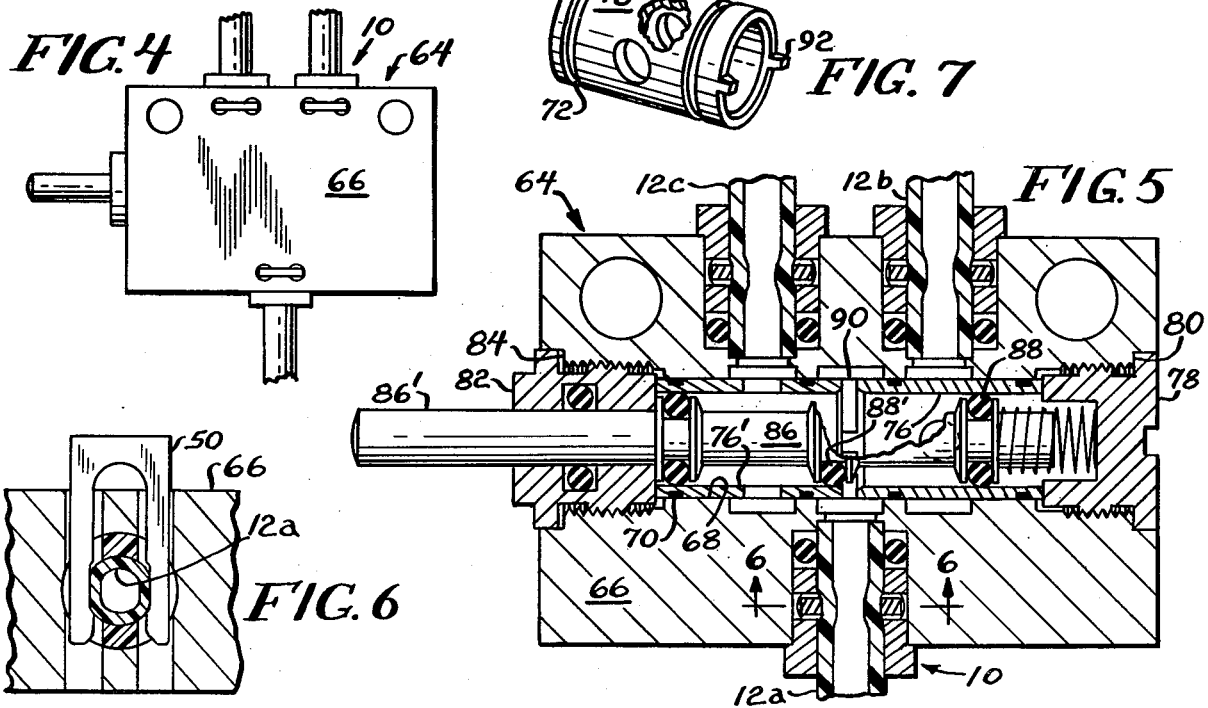

CONNECTOR SYSTEM FOR FLEXIBLE TUBING

BACKGROUND OF THE INVENTION

The invention relates to tube connectors and particularly to connectors of the type used for attaching tubing to devices such as pneumatic valves and cylinders, for example. Most prior art connectors of this type take the form of special fittings which must be threaded into a correspondingly threaded hole in the device, thus requiring a considerable amount of space for access to the fitting by a wrench, for example. U.S. Pat. No. 4,021,062 discloses a coupling wherein a tube retaining collet element and O-ring are permanently mounted inside a fitting member. U.S. Pat. No. 4,059,295 discloses a coupling in which a relatively thick walled two-piece sleeve member surrounds the tubing and engages it with a series of internal ribs. The sleeve member is retained relative to the coupling body by a U-shaped clip and is spaced from an O-ring by a ring member. A somewhat similar coupling is disclosed on pages 3662, 3663 of IBM Technical Disclosure Bulletin, Vol. 20, No. 9 dated February 1978. The latter publication discloses a fitting in which a sleeve member is held in place inside a body member by a retaining ring which frictionally engages the inner wall of the body member. The tubing is removably inserted in the sleeve member and is retained to the sleeve but not to the body member by a C-shaped clip which passes through transverse slots on opposite sides of the sleeve.

SUMMARY OF THE INVENTION

It is among the objects of the present invention to provide a connector system for flexible tubing which provides an effective seal, consumes a minimum amount of space, is simple and economical to manufacture, is easily installed and removed without tools, is reusable, and which permits a limited degree of rotation of the tubing when connected. These and other objects and advantages are achieved by the connector system of the present invention which is generally described in the Abstract. The compactness of the connector system is a particular advantage when space is limited or when, for example, it is desirable to make a plurality of tubing connections to a device such as a multiple-ported spool valve. The capability of rotating the tubing after it is assembled to the connector makes it possible to remove any undesirable twisting in a length of tubing from one end to the other or to perhaps add a little twist to provide clearance around an obstruction. The system can also be used in fittings. For example, by providing the system on one side surface of a small plastic fitting block and by having an integrally connected stub length of tubing projecting from a side surface at right angles to the first surface, one could attach a length of tubing to a cylinder end surface so it would project at right angles. This would be done by attaching the tubing to the fitting connector and the fitting stub tube to the cylinder end surface connector system.

BRIEF DESCRIPTION OF THE DRAWINGS

FIG. 1 is an exploded perspective view showing the connector elements;

FIG. 2 is an axial section through the connector and tubing taken on line 2—2 of FIG. 1;

FIG. 3 is a transverse section taken on line 3—3 of FIG. 1;

FIG. 4 is a plan view of a 3-way, 3-ported spool valve using three of the connector elements of FIGS. 1–3;

FIG. 5 is a cross-sectional view taken in the plane of the axes of the connector elements of FIG. 4;

FIG. 6 is a section view taken on line 6—6 of FIG. 5;

FIG. 7 is a perspective view of one of the valve sleeves in FIG. 5; and,

FIG. 8 is a perspective view of a right angled fitting incorporating the connector system.

DETAILED DESCRIPTION OF THE DRAWINGS

Referring to FIGS. 1–3, my improved connector assembly system is indicated generally at 10 and is shown in exploded relationship relative to a length of plastic tubing 12 and to the port opening 14 of a body portion 16 of a device such as an air cylinder 18. The port opening 14 in the body portion is stepped and comprises an outer, enlarged diameter recessed opening portion 22 and an inner, reduced diameter recessed opening portion 24. The inner end of the opening 24 is defined by a transverse wall surface 26 or equivalent structure which functions as an end stop for the tubing 12. An aperture 28 communicates the tubing to the interior or the air cylinder 18. A flatted surface 32 formed on the body portion 16 has two parallel openings 34 formed in it which are evenly spaced on opposite sides of the axis of opening 14 and positioned so as to intersect the inner wall of opening portion 22. The openings 34 are also positioned close enough to each other so that their nearest portions are spaced at a distance from each other which is less than the outer diameter of the tubing 12. An elastomeric O-ring sealing member 36 is dimensioned so as to sealingly engage the outer wall surface of the tubing 12 and the inner wall of the recessed opening portion 22. The O-ring 36 is positioned at a short distance from the end of the tubing 12 in an axial space defined by the transverse wall 38 at the inner end of opening 22 and the inner end of a cylindrical plastic sleeve member 40. The sleeve member 40 preferably has a flange portion 42 which is adapted to engage the end wall of the body portion 16 so as to limit its inward movement and thus insure that slot portions 44 formed to its side wall 46 will be aligned with openings 34. If desired, the sleeve 40 and body portion may have complementary guiding portions to prevent relative rotation. Alternatively, correct angular positioning could be assisted by forming an arrow or a flat top on the flange 42. The sleeve member may also be pressed into the opening 22 with the correct angular orientation achieved by a "press-fit".

When the O-ring 36 and sleeve 40 are inserted in the opening 22 so that the slots 44 are aligned with the openings 34, the tubing 12 can be passed through the sleeve and O-ring and into contact with the inner end wall 26. At this point, the bifurcated retaining clip 50 is ready to be installed with its leg portions 52 pressed into the openings 34 in the top of body 16, through the slots 44 in sleeve 40, and into the openings 34 in the bottom of the body 16. As the sharp edged leg portions 52 pass through the slots 44, they compress the tubing 12 and slightly dig into its surface so as to firmly engage it and prevent it from being pulled out. The leg portions define a pair of opposed elongated recesses 54 (FIG. 3) which capture the tube. Inwardly projecting portions 56 at the ends of the legs 52 act as stops which prevent the clips from being removed after installation without a considerable effort. Thus, there is no chance that the clips 50 will become loose from vibration, for example.

FIGS. 4–7 illustrate the use of the improved connectors in a very compact, multi-ported valve assembly indicated generally at 64. The valve assembly 64 comprises a body or housing member 66 which has an axial opening 68 which may be sealingly engaged by a plurality of O-rings 70 mounted in grooves 72 on sleeve members 76,76'. The sleeve members 76,76' are retained in a predetermined axial position by a first end cap 78 which may be threaded down tightly against a shoulder 80, and by a second end cap 82 which has clearance from its seat 84 to accommodate manufacturing tolerances in the length of the sleeve members. A spool valve member 86 has spaced outer O-rings 88 which seal the outer ends of the sleeves 76,76' and an inner O-ring 88' which moves back and forth over the gap 90 between the sleeves 76,76' when the spool plunger 86' is depressed or released. The width of the gap 90 should preferably be as narrow as possible to minimize the travel distance of the valve member 86 and thus the time required to switch the flow path of fluid in tube 12a from tube 12b to tube 12c. The flow area within the gap 90 need be no greater than the interior flow area of the tubing 12a and can be controlled by providing small spacer tabs or projections 92 on the sleeve 76. The sleeve 76' can be without tabs or could be identical with sleeve 76 with the sleeves being oriented so that the tabs 92 would overlap each other.

FIG. 8 shows that the connector system can be used to provide a fitting, such as a right angle fitting, to avoid the expense and space requirements of threaded angled fittings. A fitting block 100, molded of plastic, for example, has a stub length of integrally bonded tubing 102 projecting from one side surface thereof. The stub 102 could be installed in sleeve 40 in the end of cylinder 18 of FIG. 1 in place of the tubing 12 shown. The stub, after engagement by clip 50, would then be free to rotate along with the fitting block 100 so that a length of tubing 112 attached to fitting block 100 by a sleeve 140 and clip 150 could be directed in any desired radial direction relative to the cylinder 18. The fitting is thus far more versatile than a threaded angle fitting which must be rotated until its threads are tightly engaged.

The openings 34 for the clip legs 52 are shown as spaced holes in the various figures. However, when the body, such as a fitting, cylinder end cap, or valve containing the connector system, is to be molded of plastic or metal, it might be preferable to join the spaced openings so as to form a slot for ease of manufacture. Furthermore, when the stub length of tubing 102 extending from the fitting 100 is molded along with the body of the fitting so as to be rigid, rather than flexible, it would be desirable to form an annular groove in the stub length of tubing so as accommodate the retaining clip 150 since the tubing could not be compressed.

I claim as my invention:

1. A connector assembly for connecting one end of a plastic tube to a port opening in a device with which the tube is in fluid transport relation, said device including a stepped recessed port opening having an inner opening portion sized to receive a short length of said one end of the tube and an outer opening portion having a larger internal diameter, a sealing O-ring positioned in said outer opening portion, said O-ring being adapted to sealingly engage the inner wall of said outer opening portion and the periphery of the tube at a short distance from its inserted end, a cylindrical sleeve member having inner and outer wall surfaces surrounding a portion of the length of the tube axially outwardly from said O-ring and substantially filling the space between the tube and the inner wall of the outer opening portion, said sleeve member having, axially transverse thereto, a pair of oppositely disposed slots through its wall surfaces intermediate its ends, said device having a pair of spaced, parallel opening portions which are transverse to the axis of the outer opening portion and pass through said outer opening portion, and a bifurcated retaining member having generally parallel elongated leg portions which are adapted to be inserted into said pair of parallel opening portions in said device, into said pair of slots in said sleeve member when said slots are aligned with said parallel opening portions, and into compressive contact with opposed sides of a length of tubing mounted in said sleeve member.

2. A connector assembly in accordance with claim 1 wherein said device is an air cylinder.

3. A connector assembly in accordance with claim 1 wherein said device is a multi-spaced valve assembly.

4. A connector assembly in accordance with claim 1 wherein said device is a fitting.

5. A connector assembly in accordance with claim 4 wherein said fitting is an integral block having a first surface containing a recessed port opening for receiving said connector assembly in a direction normal thereto and a second surface at an angle to said first surface having an integral stub length of tubing projecting therefrom, said stub length of tubing being of a sufficient diameter and length so that it is adapted to be connected into the connector assembly receiving opening of a second device.

6. A connector assembly in accordance with claim 5 wherein said second surface is at a 90° angle relative to said first surface, thereby permitting a length of tubing to be connected to said first surface so as to extend parallel to the wall of a device to which the fitting is connected and to be rotatable about the axis of the stub length of tubing to any angular position in a plane parallel to the wall of the device to which the fitting is connected.

7. A connector assembly in accordance with claim 1 wherein said pair of opening portions comprise separate circular apertures which are spaced from each other by portions of said device.

8. A connector assembly in accordance with claim 1 wherein the portions of the legs which are in compressive contact with the opposed sides of a length of tubing have sharp corners which slightly cut into the surface of the tubing.

9. A connector assembly in accordance with claim 8 wherein the elongated leg portions of said bifurcated retaining member are notched intermediate the ends of their facing portions, said notched portion being the portion which compressively contacts the tubing, the distance between said leg portions being closer at the free ends thereof than in said notched portion whereby to retain the tubing within said notched portion.

10. A connector assembly in accordance with claim 1 wherein said O-ring has an axial dimension which is less than the distance from the sleeve member to a stepped recessed transverse surface which separates said inner and outer opening portions.

* * * * *